United States Patent [19]

Komoda

[11] Patent Number: 4,533,012

[45] Date of Patent: Aug. 6, 1985

[54] INTAKE DEVICE OF AN INTERNAL COMBUSTION ENGINE

[75] Inventor: Norio Komoda, Aichi, Japan

[73] Assignee: Toyota Jidosha Kabushiki Kaisha, Toyota, Japan

[21] Appl. No.: 511,492

[22] Filed: Jul. 7, 1983

[30] Foreign Application Priority Data

Apr. 15, 1983 [JP] Japan .............................. 58-065609

[51] Int. Cl.$^3$ ............................................. B60K 13/02
[52] U.S. Cl. .................. 180/68.3; 180/69.21; 123/41.49
[58] Field of Search ................... 180/68.1, 68.2, 68.3, 180/68.4, 68.6, 69.2, 69.25, 89.17; 123/41.7, 41.49; 98/2.05

[56] References Cited

U.S. PATENT DOCUMENTS

| | | | |
|---|---|---|---|
| 2,216,111 | 10/1940 | Huet | 180/68.4 |
| 2,425,508 | 8/1947 | Chilton et al. | 180/68.3 |
| 2,881,860 | 4/1959 | Ternes | 180/68.3 |
| 4,420,057 | 12/1983 | Omote et al. | 180/68.3 |

FOREIGN PATENT DOCUMENTS

| | | | |
|---|---|---|---|
| 844862 | 8/1960 | United Kingdom | 180/68.3 |
| 849909 | 9/1960 | United Kingdom | 180/68.3 |

Primary Examiner—Joseph F. Peters, Jr.
Assistant Examiner—Mark C. Dukes
Attorney, Agent, or Firm—Oblon, Fisher, Spivak, McClelland & Maier

[57] ABSTRACT

A motor vehicle including a radiator support member which extends between fender panels. A pair of first seal members and a second seal member are arranged between the top face of the radiator support member and the bottom face of an engine hood. The first seal members extend along the radiator support member. A cutaway portion is formed between the first seal members at the center of the radiator support member. The second seal member is arranged in front of the cutaway portion. An air suction inlet of the air cleaner is arranged immediately behind the cutaway portion.

11 Claims, 4 Drawing Figures

INTAKE DEVICE OF AN INTERNAL COMBUSTION ENGINE

BACKGROUND OF THE INVENTION

1. Field of the Invention

The present invention relates to an intake device of an internal combustion engine.

2. Description of the Prior Art

In order to improve the volumetric efficiency and increase the output power of an engine, it is desirable that cold air be supplied to the engine cylinders. To this end, in one type of conventional motor vehicle, the air suction inlet of the air cleaner is placed in the low temperature region of the engine compartment so that engine compartment air having as low a temperature as possible can be fed to the engine cylinder. In another type of conventional motor vehicle, the air suction inlet of the air cleaner is placed in front of the radiator so that cold outside air can be fed into the engine cylinders.

However, if the air suction inlet of the air cleaner is placed so that engine compartment air is fed to the engine cylinders as mentioned above, since this air is heated by the engine, air having a relatively high temperature is fed into the engine cylinders. This means that a satisfactorily high volumetric efficiency cannot be obtained.

On the other hand, if the air suction inlet of the air cleaner is placed in front of the radiator, cold outside air is fed into the engine cylinders, making it possible to obtain a high volumetric efficiency. However, in this case, since the air suction inlet of the air cleaner is placed in front of the radiator, foreign matter such as snow flakes, rain water droplets, and dust enter the air cleaner via the air suction inlet thereof. This causes wetting and clogging of the air cleaner element, increasing the flow resistance of the intake air.

SUMMARY OF THE INVENTION

An object of the present invention is to provide an intake device of an internal combustion engine, which is capable of increasing the output power of the engine by feeding cold outside air to the engine cylinders while preventing snow flakes, rain water droplets, dust, and other foreign matter from entering into the air cleaner.

According to the present invention, there is provided an intake device of a motor vehicle having a pair of fender panels that define an engine compartment therebetween; a radiator support member, which has a top face and extends between the fender panels, for supporting a radiator; and an engine hood which has a bottom face approachable to the top face of the radiator support member when the engine hood covers the engine compartment, said intake device comprising first seal means arranged between the top face of said radiator support member and the bottom face of said engine hood and having a cutaway portion; second seal means arranged between the top face of said radiator support member and the bottom face of said engine hood, and in front of said cutaway portion; and an air cleaner arranged within said engine compartment and having an air suction inlet disposed immediately behind said cutaway portion.

The present invention may be more fully understood from the description of a preferred embodiment of the invention set forth below, together with the accompanying drawings.

DETAILED DESCRIPTION OF THE PREFERRED EMBODIMENT

Figure 1:
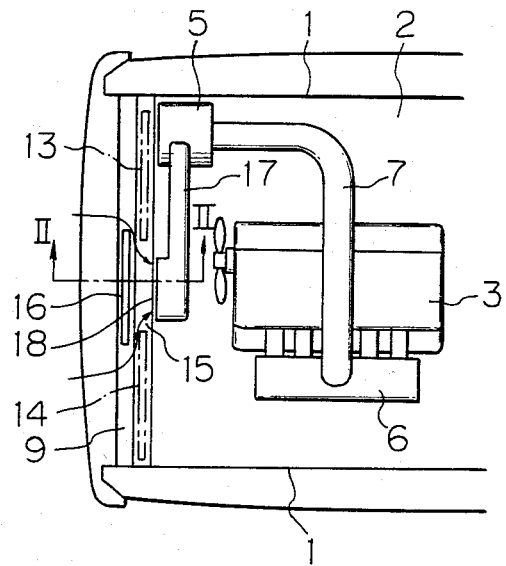
FIG. 1 is a plan view of an engine compartment with the engine hood removed.
Figure 2:
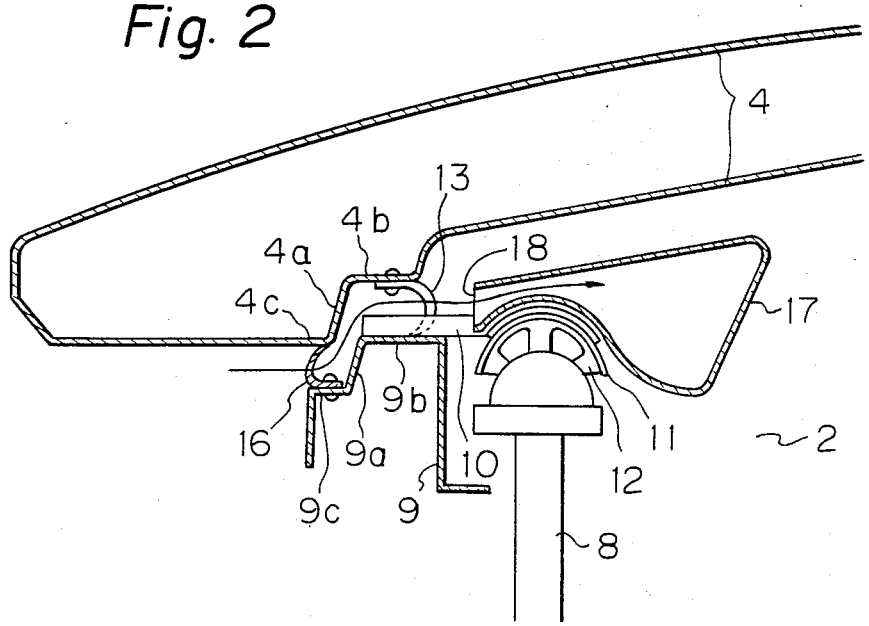
FIG. 2 is an enlarged cross-sectional side view of one part of the engine compartment in FIG. 1, taken along line II—II in FIG. 1.
Figure 3:
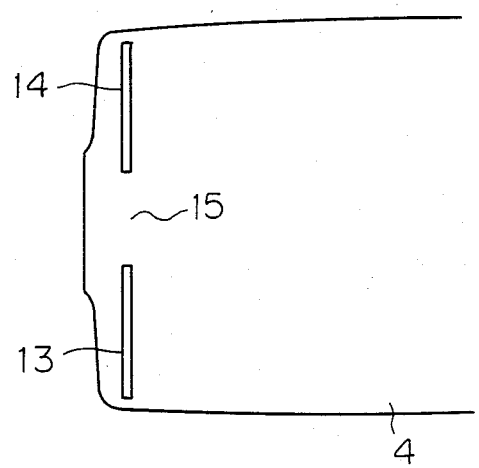
FIG. 3 is a bottom view of an engine hood.
Figure 4:
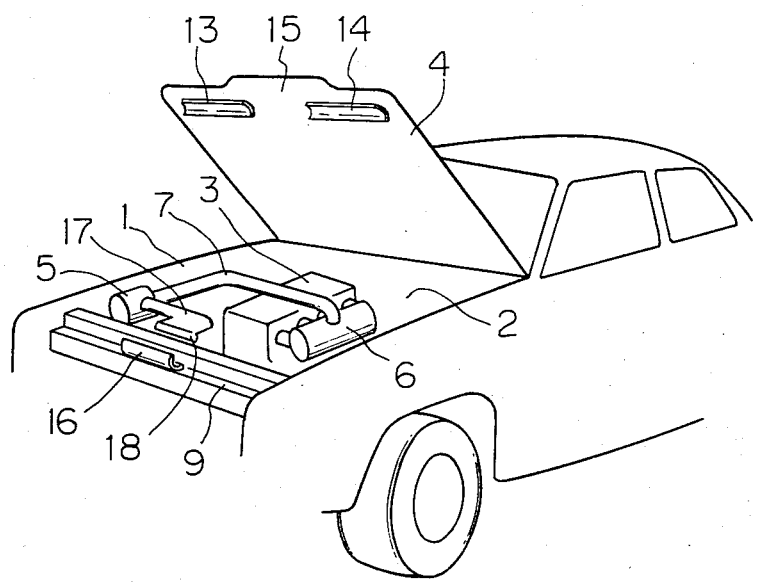
FIG. 4 is a perspective view of a motor vehicle with the engine hood opened.

In FIGS. 1 through 4, reference numeral 1 designates a pair of fender panels of a motor vehicle, 2 an engine compartment formed between the fender panels 1, 3 an engine situated in the engine compartment 2, and 4 an engine hood pivotally mounted on the vehicle body for covering the engine compartment 2; 5 designates an air cleaner located in the engine compartment 2, 6 an intake manifold or a surge tank of the engine 3, 7 an intake pipe connecting the air cleaner 5 to the surge tank 6, and 8 a radiator arranged in front of the engine 3; 9 designates a radiator support member extending between the fender panels 1. The opposite ends of the radiator support member 9 are attached to the corresponding fender panels 1. As illustrated in FIG. 2, the radiator support member 9 has an inverted U-shaped cross-section and comprises a substantially vertical intermediate top wall portion 9a formed near the top of the inverted "U" thereof, a substantially horizontal rear top wall portion 9b extending backward from the upper end of the intermediate top wall portion 9a, and a substantially horizontal front top wall portion 9c extending forward from the lower end of the intermediate top wall portion 9a. A bracket 10 is attached to the horizontal rear top wall portion 9b of the radiator support member 9, and a support member 11 having an arc-shaped cross section is attached to the tip of the bracket 10. The support member 11 is resiliently connected to the top of the radiator 8 via an elastic damping member 12. The top of the radiator 8 is thus supported by the radiator support member 9 via the elastic damping member 12 and the bracket 10.

A portion of the lower face of the engine hood 4, said portion facing the radiator support member 9, comprises a substantially vertical bottom wall portion 4a, a substantially horizontal rear bottom wall portion 4b extending backward from the upper end of the vertical bottom wall portion 4a, and a substantially horizontal front bottom wall portion 4c extending forward from the lower end portion of the vertical bottom wall portion 4a. When the engine hood 4 covers the engine compartment 2 as shown in FIG. 2, the horizontal rear top wall portion 9b of the radiator support member 9 faces the horizontal rear bottom wall portion 4b of the engine hood 4, and the horizontal front top wall portion 9c of the radiator support member 9 faces the horizontal front bottom wall portion 4c of the engine hood 4.

A pair of band-like first seal members 13, 14 extending from the center of the radiator support member 9 towards the opposite ends thereof are mounted on the horizontal rear bottom wall portion 4b of the engine hood 4. The first seal members 13, 14 have a C-shaped cross section, as shown in FIG. 2, and the upper end portions of the first seal members 13, 14 are attached to the horizontal rear bottom wall portion 4b. When the engine hood 4 is closed over the engine compartment 2 as shown in FIG. 2, the lower ends of the first seal members 13, 14 come into contact with the horizontal rear top wall portion 9b of the radiator support member 9. The first seal members 13, 14 are arranged so that the inside end of the first seal member 13 is spaced apart from the inside end of the first seal member 14, thus forming a cutaway portion 15 therebetween. FIG. 1 shows the situation where the engine has the engine hood 4 removed. Here, the broken lines show the locations of the first seal members 13, 14 when the engine hood 4 is closed over the engine compartment 2.

A band-like second seal member 16 is mounted on the center of the horizontal front top wall portion 9c of the radiator support member 9. The second seal member 16 has a C-shaped cross section as shown in FIG. 2, and the lower end of the second seal member 16 is fastened onto the horizontal front top wall portion 9c. When the engine hood 4 is closed over the engine compartment 2, the upper end of the second seal member 16 comes into contact with the rear end portion of the horizontal front bottom wall portion 4c of the engine hood 4. As is clear from FIG. 1, the second seal member 16 has a length greater than the transverse width of the cutaway portion 15, and the opposite ends of the second seal member 16 are located transversely outward relative to the corresponding inside ends of the first seal members 13, 14. Consequently, the first seal members 13, 14 and the second seal member 16 are so constructed that the second seal member 16 covers the cutaway portion 15 upstream or in front thereof.

The air cleaner 5 is equipped with an air nose 17 extending along the radiator support member 9, and an air suction inlet 18 having a flat rectangular cross-sectional shape is formed on the end of the air nose 17. The air suction inlet 18 is arranged immediately behind the cutaway portion 15, and the opening of the air suction inlet 18 is directed towards the cutaway portion 15. The air suction inlet 18 has a height which is approximately equal to the vertical distance between the radiator support member 9 and the engine hood 4, and a transverse width which is slightly smaller than the transverse width of the cutaway portion 15.

When the engine is running outside air passes through the gaps between the first seal members 13, 14 and the second seal member 16, and as shown by the arrows in FIGS. 1 and 2. The outside air then passes through the cutaway portion 15 and flows into the air nose 17 via the air suction inlet 18. The outside air flows upward along the vertically zigzagging path between the radiator support member 9 and the engine hood 4, concurrent with which it flows along the horizontally zigzag path between the second seal member 16 and the first seal members 13, 14, and into the air nose 17, as shown by the arrows in FIG. 1. After this, the outside air is fed into the cylinders of the engine 3 via the air cleaner 5, the intake pipe 7, and the surge tank 6. As mentioned above, the outside air is made to flow along the vertically and horizontally zigzagging paths. Foreign materials such as snow flakes and rainwater droplets thus impinge upon the first seal members 13, 14, the second seal member 16, and the intermediate top wall portion 9a of the radiator support member 9, and flow away towards the outside of the engine compartment 2. Thus, it is possible to prevent such foreign material from entering the air cleaner 5.

In the embodiment illustrated in FIGS. 1 through 4, the first seal members 13, 14 are attached to the engine hood 4, and the second seal member 16 is attached to the radiator support member 9. However, the first seal members 13, 14 may be attached to the radiator support member 9, and the second seal member 16 to the engine hood 4. In addition, the first seal members 13, 14 and the second seal member 16 may all be attached to the engine hood 4 or the radiator support member 9.

According to the present invention, since wetting and clogging of the air cleaner element by foreign materials such as snow flakes, rain water droplets, and dust is prevented, there is no danger of an increase in the flow resistance of the intake air. In addition, cold outside air is fed into the engine cylinders. Therefore, a high volumetric efficiency can always be obtained, making it possible to obtain a high engine output.

While the invention has been described by reference to a specific embodiment chosen for purposes of illustration, it should be apparent that numerous modifications could be made thereto by those skilled in the art without departing from the basic concept and scope of the invention.

I claim:

1. An intake device of a motor vehicle having a pair of fender panels that define an engine compartment therebetween, a radiator support member which has a top face and extends between the fender panels for supporting a radiator; and an engine hood which has a bottom face approachable to the top face of the radiator support member when the engine hood covers the engine compartment, said intake device comprising:

first seal means arranged between the top face of said radiator support member and the bottom face of said engine hood and having a cutaway portion of a given transverse width;

second seal means arranged between the top face of said radiator support member and the bottom face of said engine hood and upstream of said cutaway portion; and an air cleaner arranged within said engine compartment and having an air suction inlet disposed immediately behind said cutaway portion wherein said first seal means comprises a pair of band-like seal members each having an inside end that defines said cutaway portion, said seal members extending along said radiator support member from the center of said radiator support member to the opposite ends thereof;

said second seal means consists of a band-like seal member extending transversely along said radiator support member and having a transverse width that is slightly larger than the transverse width of said cutaway portion such that said second seal means covers the entirety of said cutaway portion;

the top face of said radiator support member extends between and interconnects said pair of fender panels and comprises a substantially vertical intermediate top wall portion, a substantially horizontal rear top wall portion extending backward from an upper end of said intermediate top wall portion and a substantially horizontal front top wall portion extending forward from a lower end of said intermediate top wall portion, and the bottom wall of said engine hood comprises a substantially vertical bottom wall portion, a substantially horizontal rear bottom wall portion horizontally extending backward from an upper end of said vertical bottom wall portion and facing said horizontal rear top wall portion of said radiator support member, and a substantially horizontal front bottom wall portion which horizontally extends forward from a lower end of said vertical bottom wall portion and faces said horizontal front top wall portion of said radiator support member; and said first seal means is mounted so as to be secured between said horizontal rear top wall portion of said radiator support member and said horizontal rear bottom wall portion, and said second seal means is arranged between said horizontal front top wall portion of said radiator support member and said horizontal front bottom wall portion of said engine hood.

2. An intake device according to claim 1, wherein said seal members are attached to the bottom face of said engine hood.

3. An intake device according to claim 1, wherein said seal members have a C-shaped cross section.

4. An intake device according to claim 1, wherein said seal member is attached to the top face of said radiator support member.

5. An intake device according to claim 1, wherein said seal member has a C-shaped cross section.

6. An intake device according to claim 1, wherein the top face of said radiator support member and the bottom face of said engine hood form a zigzagging air flow path therebetween.

7. An intake device according to claim 1, wherein the opening of said air suction inlet is directed towards said cutaway portion.

8. An intake device according to claim 7, wherein said air suction inlet has a transverse width that is slightly smaller than that of said cutaway portion.

9. An intake device according to claim 7, wherein said air suction inlet has a height which is approximately equal to the vertical distance between said radiator support member and said engine hood.

10. An intake device according to claim 7, wherein said air suction inlet has a flat rectangular cross-sectional shape.

11. An intake device according to claim 7, wherein said air cleaner has an air nose extending along said radiator support member, said air suction inlet being formed at an end of said air nose.

* * * * *